United States Patent
Gfeller et al.

(10) Patent No.: US 9,185,749 B2
(45) Date of Patent: Nov. 10, 2015

(54) APPARATUS FOR HEATING A WORKPIECE, IN PARTICULAR A ROLLER BEARING

(75) Inventors: Hans Gfeller, Aarwangen (CH); Max Wyssman, Herzogenbuchsee (CH)

(73) Assignee: Simatec AG, Wangen an der Aare (CH)

( * ) Notice: Subject to any disclaimer, the term of this patent is extended or adjusted under 35 U.S.C. 154(b) by 393 days.

(21) Appl. No.: 13/699,212

(22) PCT Filed: May 16, 2011

(86) PCT No.: PCT/EP2011/057876
§ 371 (c)(1),
(2), (4) Date: Nov. 20, 2012

(87) PCT Pub. No.: WO2011/147706
PCT Pub. Date: Dec. 1, 2011

(65) Prior Publication Data
US 2013/0068758 A1    Mar. 21, 2013

(30) Foreign Application Priority Data

May 26, 2010   (EP) .................................... 10163943

(51) Int. Cl.
*H05B 6/22* (2006.01)
*H05B 6/02* (2006.01)
*H05B 6/10* (2006.01)

(52) U.S. Cl.
CPC ... *H05B 6/02* (2013.01); *H05B 6/10* (2013.01)

(58) Field of Classification Search
CPC .................................... H05B 6/10; H05B 6/02
USPC ................. 219/602, 635, 601, 640, 654–656; 148/112, 569
See application file for complete search history.

(56) References Cited

U.S. PATENT DOCUMENTS

| | | | |
|---|---|---|---|
| 4,311,896 A | | 1/1982 | Junya |
| 4,619,717 A | * | 10/1986 | Balzer et al. ................... 148/112 |
| 4,855,556 A | * | 8/1989 | Mucha et al. .................. 219/640 |
| 2006/0289495 A1 | * | 12/2006 | Thomas et al. ............... 219/677 |

(Continued)

FOREIGN PATENT DOCUMENTS

| | | |
|---|---|---|
| DE | 20 2004 011 590 U1 | 9/2004 |
| GB | 1 454 783 A | 11/1976 |

(Continued)

*Primary Examiner* — Thien S Tran
(74) *Attorney, Agent, or Firm* — Laurence A. Greenberg; Werner H. Stemer; Ralph E. Locher

(57) ABSTRACT

An apparatus for heating a workpiece, particularly a roller bearing, having low power consumption, rapid heating and low weight, includes a truncated conical contact surface for horizontal workpiece bearing, a single-layer solenoid coil underneath the contact surface, following the contact surface shape relative to its covered surface and gradient, resulting in magnetic lines of force concentrated in an internal workpiece area and a driver resonant circuit producing an alternating magnetic field in the solenoid coil. The workpiece is inductively heated quickly without requiring pushing onto a magnet yoke, because of its horizontal bearing. The planar configuration of the solenoid coil, following the contact surface shape, causes operation of the driver resonant circuit at high frequency, resulting in low power consumption. The profile of lines of force causes the magnetic field to directly enter areas to be heated on an upper workpiece surface, ensuring homogeneous workpiece heating.

11 Claims, 2 Drawing Sheets

(56) References Cited

U.S. PATENT DOCUMENTS

2011/0174806 A1 7/2011 Burtchen et al.
2011/0226757 A1 9/2011 David et al.

FOREIGN PATENT DOCUMENTS

WO 2009/112247 A1 9/2009
WO 2010/037414 A1 4/2010

* cited by examiner

APPARATUS FOR HEATING A WORKPIECE, IN PARTICULAR A ROLLER BEARING

BACKGROUND OF THE INVENTION

Field of the Invention

The present invention relates to an apparatus for heating a workpiece, in particular a roller bearing.

Apparatuses for heating roller bearings are used to mount bearings or annular parts on a shaft or in a bearing housing without the application of force. The thermal expansion of the metals is used to achieve the required clearance for fitting the bearing or the annular parts. For rapid heating of the roller bearing, induction heaters are nowadays often used instead of, for example, hot oil baths, heating plates or furnaces as was previously the case.

Such induction heaters are commercially available, for example, under the trade name "simatherm" from simatec AG, Wangen an der Aare, Switzerland. These induction heaters are made up of laminated iron cores, removable, displaceable or swivelable yokes and induction coil. The devices typically operate from a 50 Hz/60 Hz line supply. The roller bearing to be heated is placed over the induction coil or yoke. To cover different roller bearing sizes, yokes of different sizes can also be disposed within the magnetic circuit. The roller bearing is selectively heated via induction current flow in the inner ring of the roller bearing.

For physical reasons, however, induction heaters of this kind are comparatively heavy and in some cases also require considerable strength for suspending and removing the roller bearing depending on the weight thereof. In addition, such induction heaters are not easily transportable.

BRIEF SUMMARY OF THE INVENTION

The object of the present invention is therefore to specify an apparatus for heating a workpiece, in particular a roller bearing, that is characterized by a low power consumption, a rapid heating phase allowing, for example, selective heating of the inner ring of the roller bearing, and by a low weight making it also ideally suitable for mobile use.

This object is achieved according to the invention by an apparatus for heating a workpiece, in particular a roller bearing, said apparatus comprising the following component parts:
a) a truncated cone shaped contact surface for horizontally supporting the workpiece;
b) a single-layer solenoid disposed below the contact surface and essentially following the shape of the contact surface in respect of its covered surface and gradient; and
c) a driver resonant circuit for generating an alternating magnetic field in the solenoid.

In this way the workpiece can be quickly and inductively heated, and also, because it is horizontally supported on the contact surface, does not need to be pushed onto a magnet yoke. Because of the planar design of the solenoid which follows the truncated cone shape of the contact surface, the driver resonant circuit can be operated at high frequency, which means low power consumption and small overall size. The alternating magnetic field lines of force pattern produced by the truncated cone shaped solenoid causes the magnetic field to thus selectively enter the inner region of the workpiece, e.g. the inner ring of a roller bearing, directly into the regions to be heated, thereby ensuring particularly homogeneous and efficient heating of the workpiece.

In order to ensure particularly good magnetic circuit feedback, it can be provided to dispose radially running ferrite rods under the solenoid. A suitable number of said radially running ferrite rods thus feed back the lines of force traveling in the air gap below the workpiece. Eight uniformly distributed ferrite rods, for example, are suitable in the case of this generally circular contact surface.

In order to also enable in particular small workpieces to be heated, there can be disposed in the center of the contact surface a chimney-like stub on the external circumference of which solenoid turns are likewise disposed. Alternatively, however, a design can be provided such that there is disposed in the center of the contact surface a cone-shaped cap having a ferrite core for feeding back the lines of force.

Operation of this apparatus can then be particularly advantageously achieved if the alternating magnetic field frequency is between 10 and 50 kHz, preferably in the range 20 to 30 kHz. This means that the driver frequency of the driver resonant circuit is in a range that is also suitable for induction hobs, for example.

To securely support the roller bearing, the contact surface can be implemented as a heat-resistant plastic dish which preferably has a grid or step centering corresponding to standard roller bearing dimensions.

In order to be able to make the apparatus operate as economically as possible, it can be provided that the driver resonant circuit automatically selects its operating point at least as close as possible to the resonant frequency in a workpiece-dependent manner by tuning the frequency as a function of the impulse response. For this purpose the driver frequency can be tuned stepwise using a synthesizer, for example, e.g. in increments of 200 Hz, or even smaller when approaching the resonant frequency.

In order to be able to reliably eliminate microstructural changes in the metal workpiece occurring as a result of overheating, a temperature sensor for measuring the temperature of the roller bearing can be provided for setting the driver resonant circuit. For closed loop control in this context, the temperature is therefore the controlled variable at the input of the control loop.

Alternatively or also additionally to the above temperature adjustment, a timer circuit can be provided in order to activate the driver resonant circuit for a predefinable period of time.

BRIEF DESCRIPTION OF THE SEVERAL VIEWS OF THE DRAWING

Preferred exemplary embodiments of the present invention will now be explained in greater detail with reference to the accompanying drawings in which.

DESCRIPTION OF THE INVENTION

Figure 1:
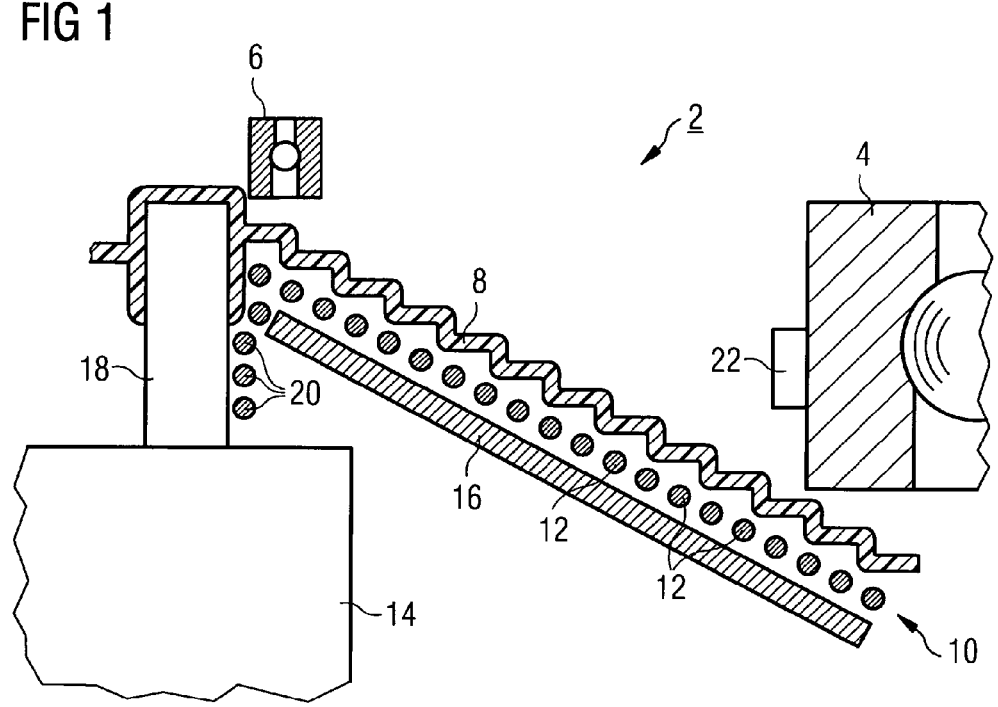
FIG. 1 schematically illustrates a side of a longitudinal section through a heater with two roller bearings placed thereon by way of example.

FIG. 1 schematically illustrates a side of a longitudinal section through a heater 2 with two roller bearings 4, 6 placed thereon by way of example (generally only one roller bearing will be on the heater 2 during operation). The heater 2 comprises a truncated cone shaped contact surface 8 for horizontally supporting the roller bearing 4, 6. Disposed below the contact surface 8 is a single-layer solenoid 10 with its turns 12 which essentially follows the shape of the contact surface 8 in respect of the surface covered thereby and of the gradient. A driver resonant circuit 14 for producing an alternating magnetic field in the solenoid 10 is also provided. To feed back the magnetic field produced by the solenoid 10, radially running ferrite rods 16 are disposed below the solenoid 10.

In this exemplary embodiment, there is disposed in the center of the contact surface 8 a chimney-like stub 18 on the outer circumference of which turns 20 of the solenoid 10 are likewise disposed. This design allow even small roller bearings 6, here a type 6002 bearing having an internal diameter of 15 mm, for example, to be heated quickly and efficiently. As an alternative to the stub 18, a conical cap having a ferrite core could also be disposed in a manner not shown in greater detail here.

Figure 2:
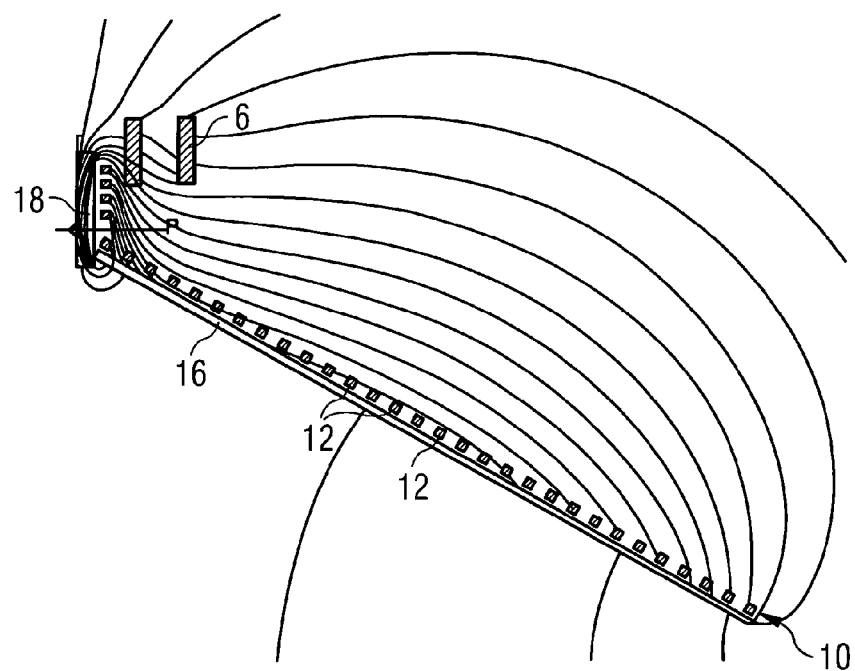
FIG. 2 schematically illustrates the pattern of the magnetic lines of force for the larger of the two roller bearings from FIG. 1.
Figure 3:
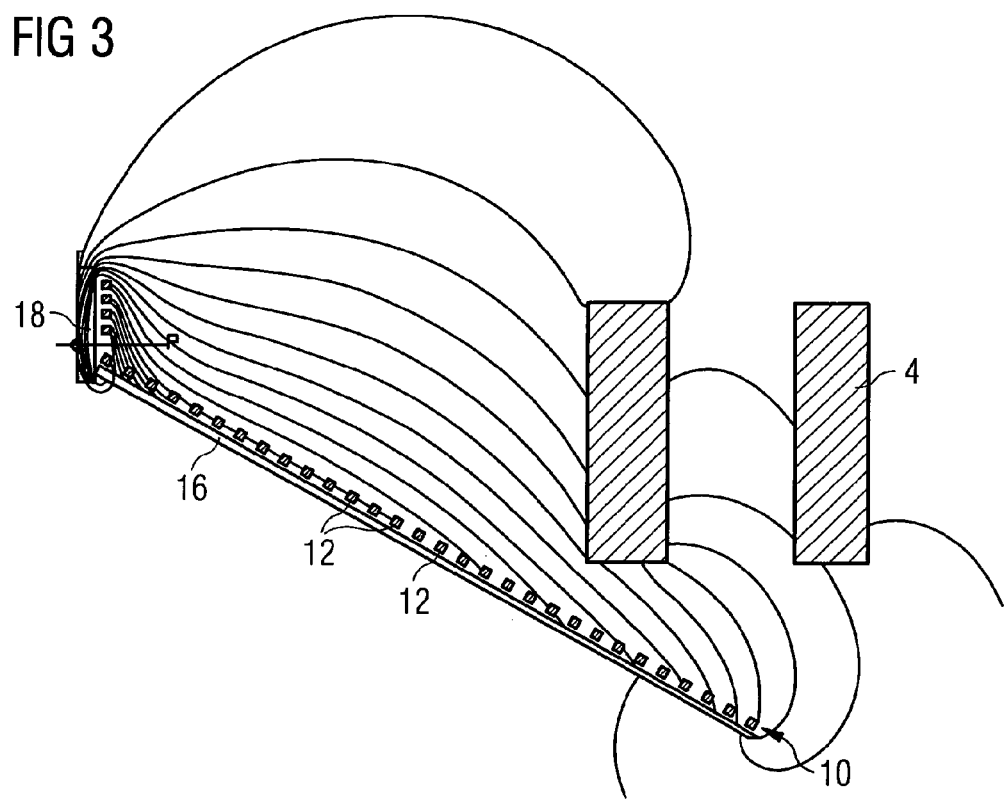
FIG. 3 schematically illustrates the pattern of the magnetic lines of force for the smaller of the two roller bearings from FIG. 1.

The pattern of the magnetic lines of force for this small roller bearing 6 is shown in FIG. 2. FIG. 3 correspondingly shows the pattern of the magnetic lines of force for a larger roller bearing 4, here by way of example a type 6030 bearing having an internal diameter of 150 mm. For both roller bearings 4 and 6, FIGS. 2 and 3 show very clearly that, because of the truncated cone-like shape of the solenoid 10, the magnetic lines of force not only cause eddy currents on the underside of the bearings 4, 6, but also occur on the upper side of the bearings 4, 6 where they likewise in preferred manner cause eddy current heating in the inner region of the workpiece, here primarily in the inner ring of the roller bearing.

This heater 2 is here intended to operate at an alternating magnetic field frequency of 25 kHz. In general this frequency can range from 10 to 50 kHz, preferably from 20 to 30 kHz. This driver frequency is therefore in the same range as that used for induction hobs.

In this exemplary embodiment, the contact surface 8 is implemented as a heat-resistant plastic dish and has a step centering corresponding to standard roller bearing dimensions. Thus a roller bearing can be placed horizontally centered on the heater 2, thereby producing homogeneous heating over the circumference of the roller bearing. The gradient of the contact surface 8 is in this example approximately 30° and is therefore within a practical range of approximately 15 to 45°. It should be noted here that the cone need have neither a constant nor a continuous gradient, but can also have a non-constant or non-continuous gradient progression as required for functional optimization.

In this example the driver resonant circuit 14 of the heater 2 is designed such that a tuning logic for determining a workpiece-dependent advantageous operating point is provided. By tuning the frequency as a function of the impulse response, the tuning logic automatically attempts to set a driver frequency which is at least as near as possible to the resonant frequency (with workpiece/roller bearing loaded). For this purpose the driver frequency is tuned stepwise using a synthesizer, here in increments of 200 Hz, or even smaller when approaching the resonant frequency.

In order to be able to reliably eliminate microstructural changes in the metal workpiece occurring as a result of overheating, a temperature sensor 22 for measuring the temperature of the roller bearing 4 can be provided for setting the driver resonant circuit. For closed loop control in this context, the temperature is therefore the controlled variable at the input of the control loop. Alternatively or also additionally to the above temperature setting, a timer circuit can be provided in order to activate the driver resonant circuit for a predefinable period of time.

The present heater 2 therefore quickly and inductively heats a roller bearing or in general also any, preferably annular, metal workpiece. Because the roller bearing 4, 6 is horizontally supported on the contact surface 8, the roller bearing does not need to be pushed onto a magnet yoke as is required according to the prior art. Because of the planar design of the solenoid 10 which follows the truncated cone-like shape of the contact surface 8, the driver resonant circuit can be operated at high frequency, which means low power consumption. The resulting pattern of the lines of force of the alternating magnetic field causes the magnetic field to directly enter the inner region to be heated even on the top of the roller bearing 4, 6, thereby ensuring particularly homogeneous and efficient heating of the workpiece interior. In respect of the heating efficiency, this naturally rises with the increasing ferromagnetic character of the workpiece (roller bearing).

The invention claimed is:

1. An apparatus for heating a workpiece, the apparatus comprising:
   a) a contact surface configured to horizontally support the workpiece, said contact surface having a truncated cone shape;
   b) a single-layer solenoid coil disposed below said contact surface, said solenoid coil having a covered surface and a gradient substantially following said shape of said contact surface, and said solenoid coil having a shape configured to concentrate magnetic lines of force in an inner region of the workpiece; and
   c) a driver resonant circuit configured to generate an alternating magnetic field in said solenoid coil.

2. The apparatus according to claim 1, which further comprises radially extended ferrite rods disposed below said solenoid coil.

3. The apparatus according to claim 1, which further comprises a chimney-shaped stub disposed in a center of said contact surface, said solenoid coil having windings disposed on an outer periphery of said stub.

4. The apparatus according to claim 1, which further comprises a conical cap disposed in a center of said contact surface and having a ferrite core.

5. The apparatus according to claim 1, wherein said alternating magnetic field has a frequency in a range of 10 to 50 kHz.

6. The apparatus according to claim 1, wherein said alternating magnetic field has a frequency in a range of 20 to 30 kHz.

7. The apparatus according to claim 1, wherein said contact surface is a heat-resistant plastic dish.

8. The apparatus according to claim 7, wherein said plastic dish has gradations or step centering corresponding to roller bearing dimensions.

9. The apparatus according to claim 1, wherein said driver resonant circuit is configured to automatically select an operating point thereof at least as near as possible to a resonant frequency by tuning a frequency as a function of an impulse response.

10. The apparatus according to claim 1, wherein the workpiece is a roller bearing, and a temperature sensor is configured to measure a temperature of the roller bearing for setting said driver resonant circuit.

11. The apparatus according to claim 1, wherein the workpiece is a roller bearing.

* * * * *